United States Patent
Chen

(10) Patent No.: US 9,836,822 B2
(45) Date of Patent: Dec. 5, 2017

(54) METHOD AND TECHNICAL EQUIPMENT FOR IMAGE PROCESSING

(71) Applicant: Nokia Technologies Oy, Espoo (FI)

(72) Inventor: Xun Chen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/724,100

(22) Filed: May 28, 2015

(65) Prior Publication Data

US 2015/0348237 A1    Dec. 3, 2015

(30) Foreign Application Priority Data

Jun. 2, 2014  (GB) .................................. 1409715.8

(51) Int. Cl.
 G09G 5/00  (2006.01)
 G06T 3/60  (2006.01)
 G06T 5/00  (2006.01)

(52) U.S. Cl.
 CPC .............. G06T 3/60 (2013.01); G06T 5/005 (2013.01)

(58) Field of Classification Search
 None
 See application file for complete search history.

(56) References Cited

U.S. PATENT DOCUMENTS

| | | | |
|---|---|---|---|
| 4,637,057 A * | 1/1987 | Kermisch | G06T 3/602 345/657 |
| 6,271,935 B1 | 8/2001 | Cook | |
| 7,956,873 B2 | 6/2011 | Prakash et al. | |
| 8,463,074 B2 | 6/2013 | Johnson, III et al. | |
| 2008/0025641 A1 | 1/2008 | Lee | |
| 2009/0009613 A1 | 1/2009 | Chien | |
| 2013/0135351 A1 | 5/2013 | Tripathi et al. | |
| 2013/0182014 A1 * | 7/2013 | Park | G09G 5/00 345/649 |

FOREIGN PATENT DOCUMENTS

FR    2717926 A1    9/1995

OTHER PUBLICATIONS

"Adaptive Background After Rotation/Deskew in Imagemagick", Stackoverflow, Retrieved on Sep. 22, 2015, Webpage available at : http://stackoverflow.com/questions/14112724/adaptive-background-after-rotation-deskew-in-imagemagick.

"Fill Corners of Rotated Image", Matlab Central, Retrieved on Sep. 22, 2015, Webpage available at : http://www.mathworks.com/matlabcentral/fileexchange/1825-fill-corners-of-rotated-image.

"Setting The Corner Color in Rotated Pil Images", Bytes IT community, Retrieved on Sep. 22, 2015, Webpage available at : http://bytes.com/topic/python/answers/44420-setting-corner-color-rotated-pil-images.

(Continued)

*Primary Examiner* — Kyle Zhai
(74) *Attorney, Agent, or Firm* — Alston & Bird LLP

(57) ABSTRACT

The invention relates to a method and technical means for rotating an original image in an image frame by an angle to have a rotated image in said image frame, wherein said image frame comprising said rotated image having empty corners lacking image data; comparing the rotated image to the original image to identify remaining corners; adding content of the remaining corners to the empty corners of the image frame comprising said rotated image.

21 Claims, 18 Drawing Sheets

(56) References Cited

OTHER PUBLICATIONS

"Lossless Rotation of Jpeg Images: There's More Than One Way to Rotate a Cat", Better JPEG, Retrieved on Sep. 22, 2015, Webpage available at : http://www.betterjpeg.com/lossless-rotation.htm.
Search Report received for corresponding United Kingdom Patent Application No. 1409715.8, dated Dec. 12, 2014, 4 pages.
Extended European Search Report received for corresponding European Patent Application No. 15169517.8, dated Nov. 25, 2015, 9 pages.
"Photoshop CS5 tutorial—Content-Aware Fill", Digiretus, Retrieved on Jan. 6, 2016, Webpage available at : http://digiretus.com/tippek/cikkiro.php?SORSZAM=205.
"Replace Missing Parts of a Photo in Photoshop", Creative Pro, Retrieved on Jan. 5, 2016, Webpage available at : http://creativepro.com/replace-missing-parts-photo-photoshop/.
"Picasa—Rotating in Gimp using a Grid—Super User.", [retrieved on Feb. 15, 2017]XP055346176, Retrieved from the Internet: <URL: http://superuser.com/questions/44987/rotating-in-gimp-using-a-grid>. (dated Sep. 6, 2011) 3 pages.
"Can We Rotate an Image in MATLAB Filled with Background Color of Original Image?" [retrieved Feb. 15, 2017]. Retrieved via the Internet Archive Wayback Machine at <URL: http://web.archive.org/web/20150527075204http ://stackoverflow.com/questions/28139202/can-we-rotate-an-image-in-matlab-filled-with-background-color-of-original-image>. (dated Feb. 3, 2015) 2 pages.
Office Action for European Patent Application No. 15169517.8 dated Feb. 24, 2017, 8 pages.

\* cited by examiner

METHOD AND TECHNICAL EQUIPMENT FOR IMAGE PROCESSING

TECHNICAL FIELD

The present embodiments generally relates to image processing. In particular, the present embodiments relate to a method and technical equipment for implementing the method in order to process an image when the image is rotated.

BACKGROUND

While increasingly more image capturing devices are in the market, also image processing techniques are improving in order to have final images with e.g. better quality.

There is a need for an image processing solution to be used with images when the images are rotated.

SUMMARY

Now there has been invented a method and technical equipment implementing the method. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method, comprising rotating an original image in an image frame by an angle to have a rotated image in said image frame, wherein said image frame comprising said rotated image having empty corners lacking image data; comparing the rotated image to the original image to identify remaining corners; adding content of the remaining corners to the empty corners of the image frame comprising said rotated image.

According to a second aspect, there is provided an apparatus comprising at least one processor, memory including computer program code, the memory and the computer program code configured to, with the at least one processor, cause the apparatus to perform at least the following: rotating an original image in an image frame by an angle to have a rotated image in said image frame, wherein said image frame comprising said rotated image has empty corners lacking image data; comparing the rotated image to the original image to identify remaining corners; and adding content of the remaining corners to the empty corners of the image frame comprising said rotated image.

According to a third aspect, there is provided an apparatus comprising means for rotating an original image in an image frame by an angle to have a rotated image in said image frame, wherein said image frame comprising said rotated image has empty corners lacking image data; means for comparing the rotated image to the original image to identify remaining corners; and means for adding content of the remaining corners to the empty corners of the image frame comprising said rotated image.

According to a fourth aspect, there is provided a computer program product embodied on a non-transitory computer readable medium, comprising computer program code configured to, when executed on at least one processor, cause an apparatus or a system to: rotate an original image in an image frame by an angle to have a rotated image in said image frame, wherein said image frame comprising said rotated image has empty corners lacking image data; compare the rotated image to the original image to identify remaining corners; and add the content of the remaining corners to the empty corners of the image frame comprising said rotated image.

According to an embodiment, the rotated image is compared to the original image in the direction of rotation and in the opposite direction of rotation.

According to an embodiment, a master line is detected from the remaining corners.

According to an embodiment, the shifting distance is determined by the master line.

According to an embodiment, the shifting distance is determined by how the master line is positioned and angled.

According to an embodiment, the content of the remaining corners are shifted by the determined shifting distance.

DESCRIPTION OF THE DRAWINGS

In the following, various embodiments of the invention will be described in more detail with reference to the appended drawings, in which.

DESCRIPTION OF EXAMPLE EMBODIMENTS

Figure 2:
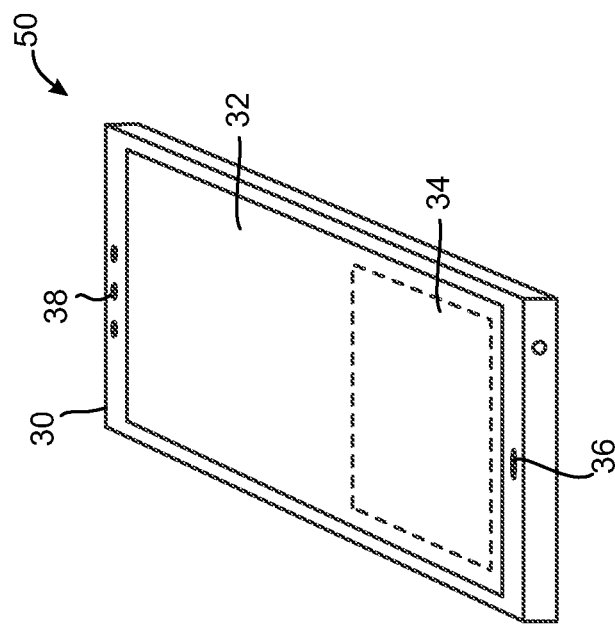
FIG. 2 shows a layout of an apparatus according to an embodiment.
Figure 1:
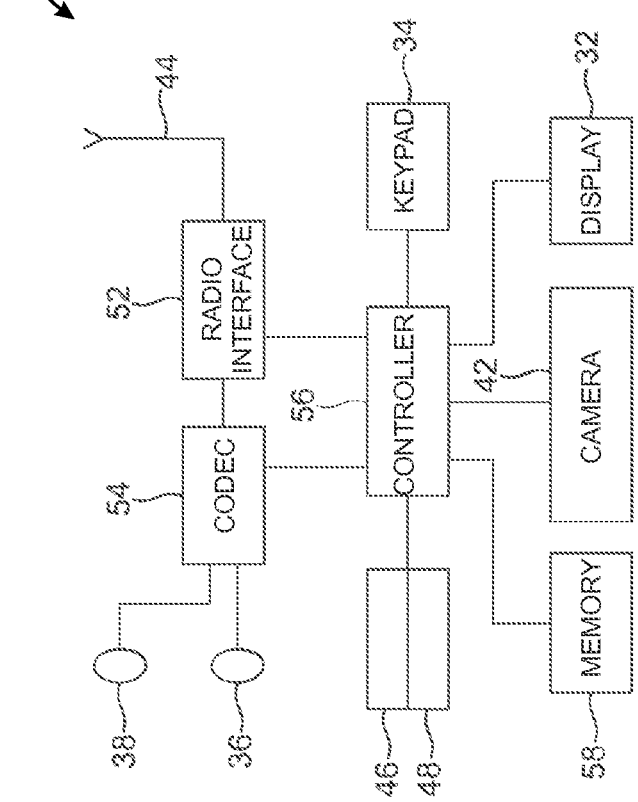
FIG. 1 shows a simplified block chart of an apparatus according to an embodiment.

FIGS. 1 and 2 illustrate an apparatus according to an embodiment. The apparatus 50 is an electronic device for example a mobile terminal or a user equipment of a wireless communication system. The embodiments disclosed in this application can be implemented within any electronic device or apparatus which is able to process image data, such as still images, alternatively also video images. The apparatus 50 may comprise a housing 30 for incorporating and protecting the device. The apparatus 50 further may comprise a display 32 in the form of a liquid crystal display. According to another embodiment, the display may be any suitable display technology suitable to display an image or video. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may further comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to codec circuitry 54 suitable for carrying out coding and decoding or audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera 42 capable of recording or detecting individual frames which are then passed to the codec 54 or controller for processing. According to an embodiment, the apparatus may receive the video image data for processing from another device prior to transmission and/or storage. According to an embodiment, the apparatus 50 may receive either wirelessly or by a wired connection the image for processing.

Figure 3:
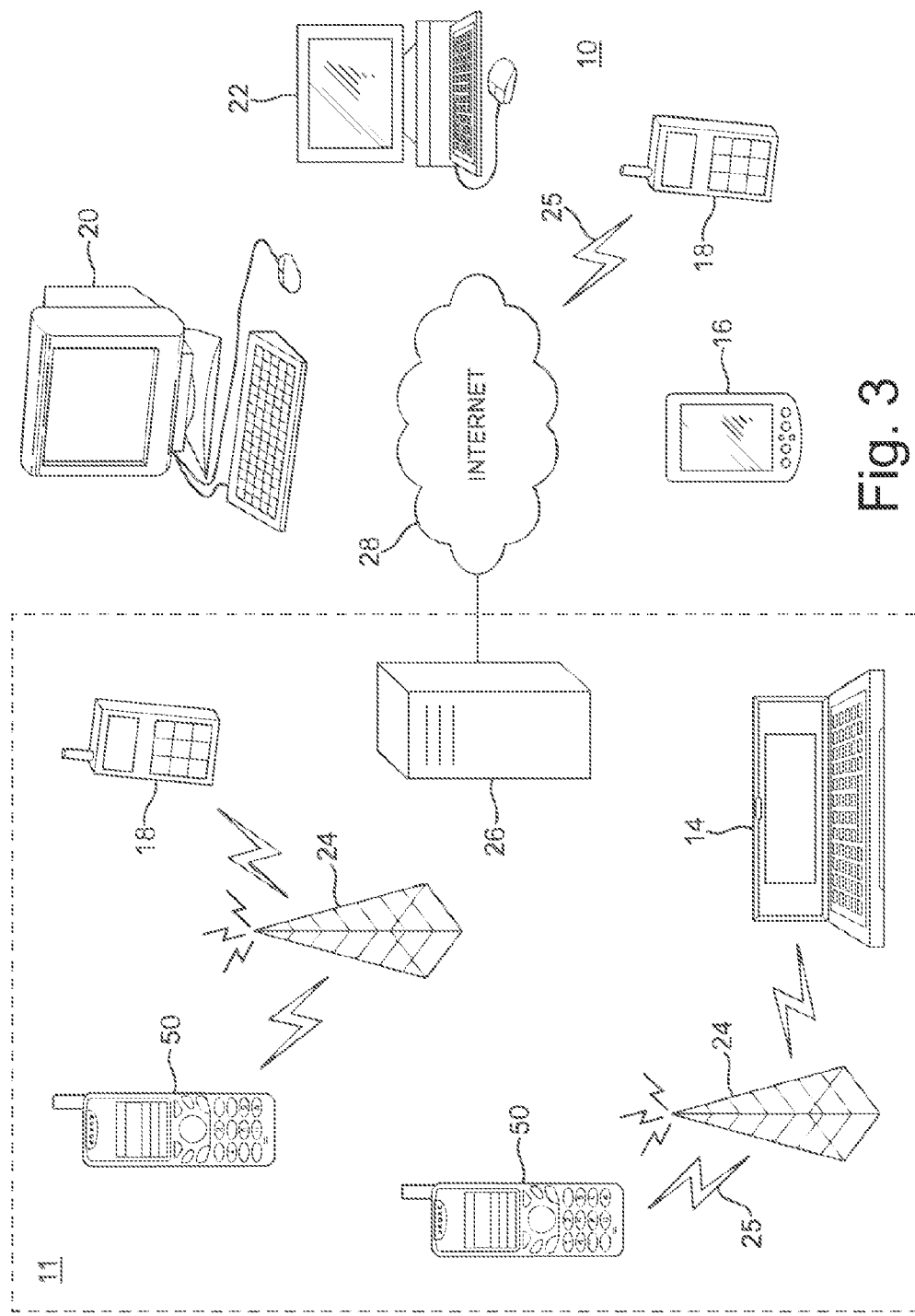
FIG. 3 shows a system configuration according to an embodiment.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

Figure 4:
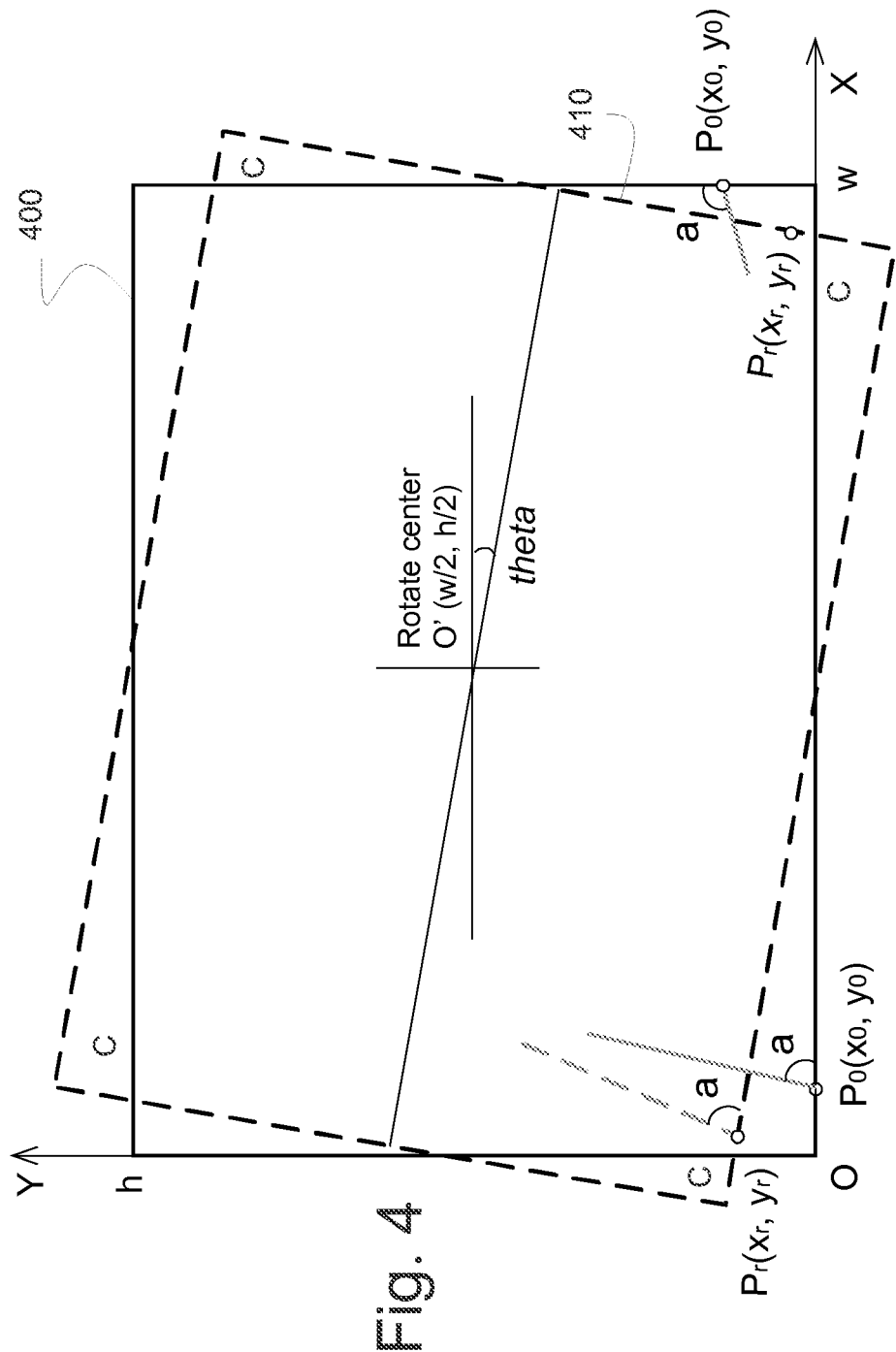
FIG. 4 shows an example of rotating a picture.

The present embodiments relate to processing image data in an electronic apparatus, when an image is rotated. FIG. 4 shows an example of an original image 400, and a rotated image 410. When an image is rotated with a small angle theta (for example 15 degrees), the original rectangular frame 400 cannot hold the rotated contents C of the picture without compensating the shifted corner.

Figures 5, 6:
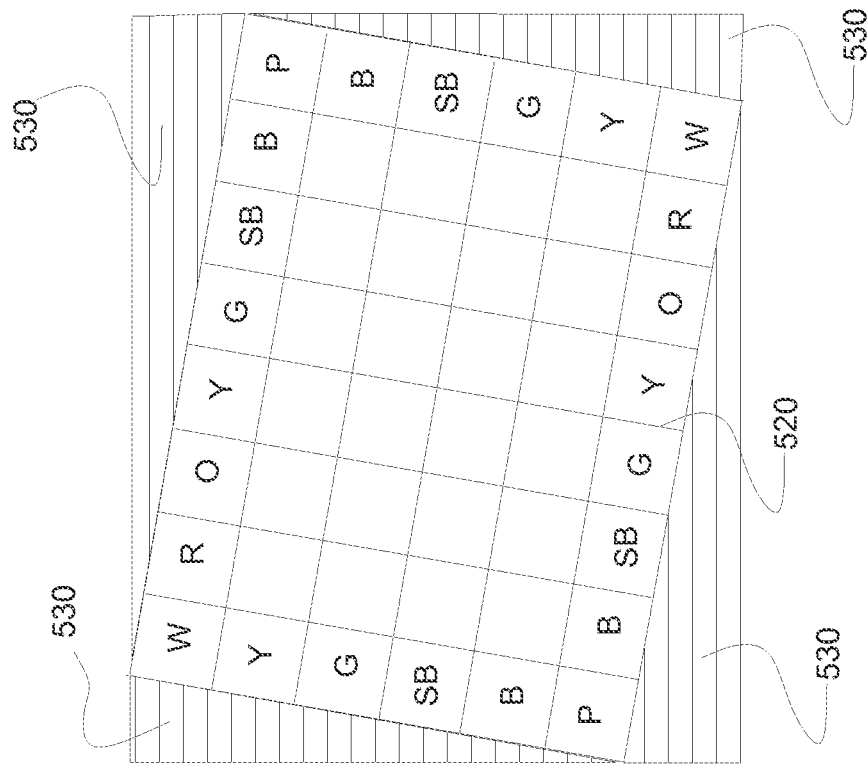
FIG. 5 shows an example of an original picture.
FIG. 6 shows an example of a rotated picture with empty background.
Figure 7:
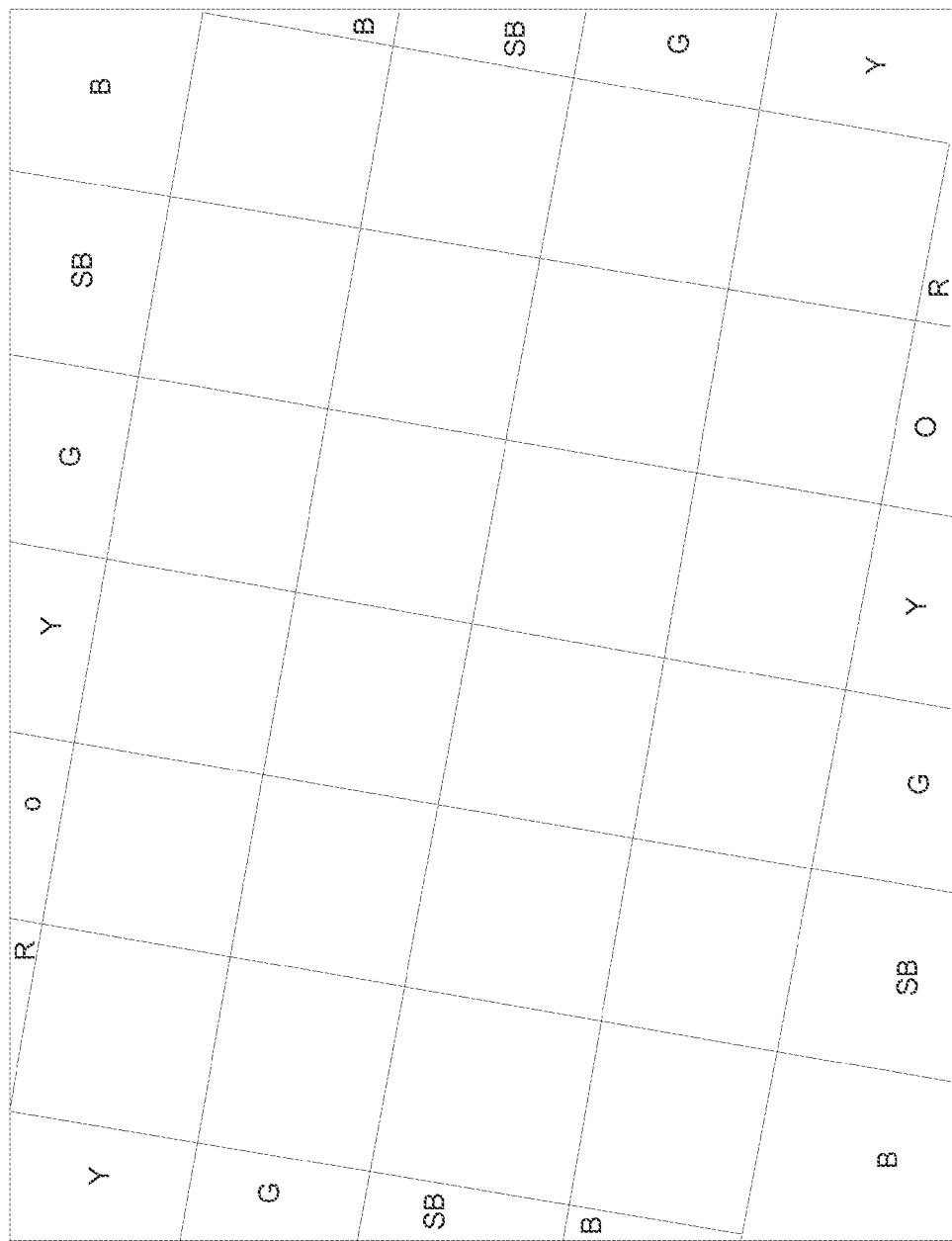
FIG. 7 shows another example of a rotated picture.

FIG. 5 illustrates an original image 510 where letters indicates colors as follows: W white; R red; O orange; Y yellow; G green; SB skyblue; B blue; P purple. There are solutions to handle the corners of original image 510 when an image is rotated. One of the known solutions is to fill the shifted four corners 530 with empty background (hatching as shown in FIG. 6). Another known solution is to cut off things that cross the rectangular frame (FIG. 7). By such solutions, either the picture loses corner contents (as in FIG. 7) or presents distorted corners (as in FIG. 6).

In the following, various embodiments for compensating rotated corners are provided. In the embodiments, the corner contents are maintained as much as possible, and bevel fillers are avoided. This is achieved by reusing partially original corners to fill the empty space. The reused corner contents will be line-detected, adjusted and translated to fit the new edges of rotated picture. After rotation of an original picture, a master line is detected from each remaining corner content to keep the rotated picture harmonized with remaining non-rotated corners (maintain the similar texture). For clearly detecting the master line from the remaining corners, the central part of the original picture is filled with virtual picture to emphasize on the remaining corners (called blackout corners). The missing corner data is finally filled, scaled, skewed according to the detected features of the line and remaining corners.

Figure 8:
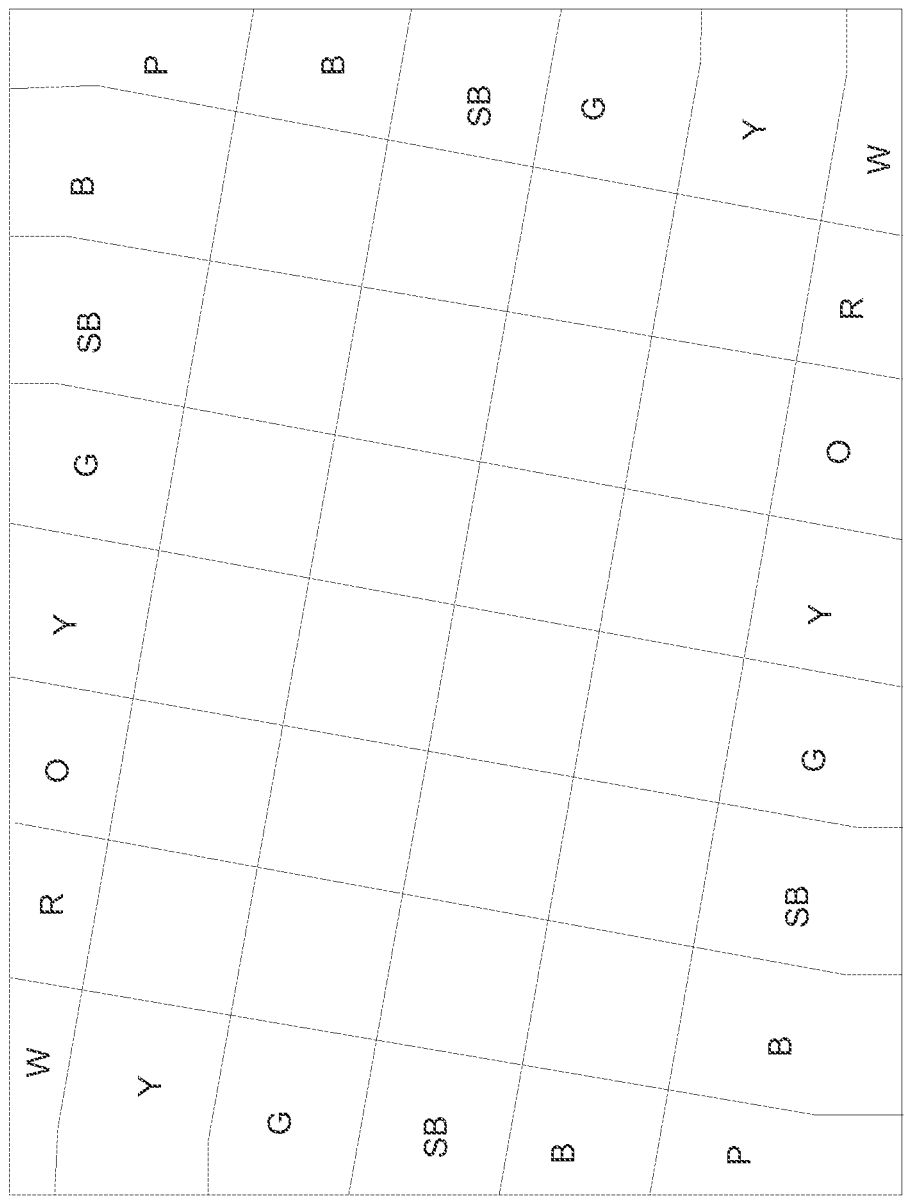
FIG. 8 shows an example of a rotated picture according to an embodiment.

FIG. 8 illustrates the image after being rotated according to present embodiments.

Figure 9:
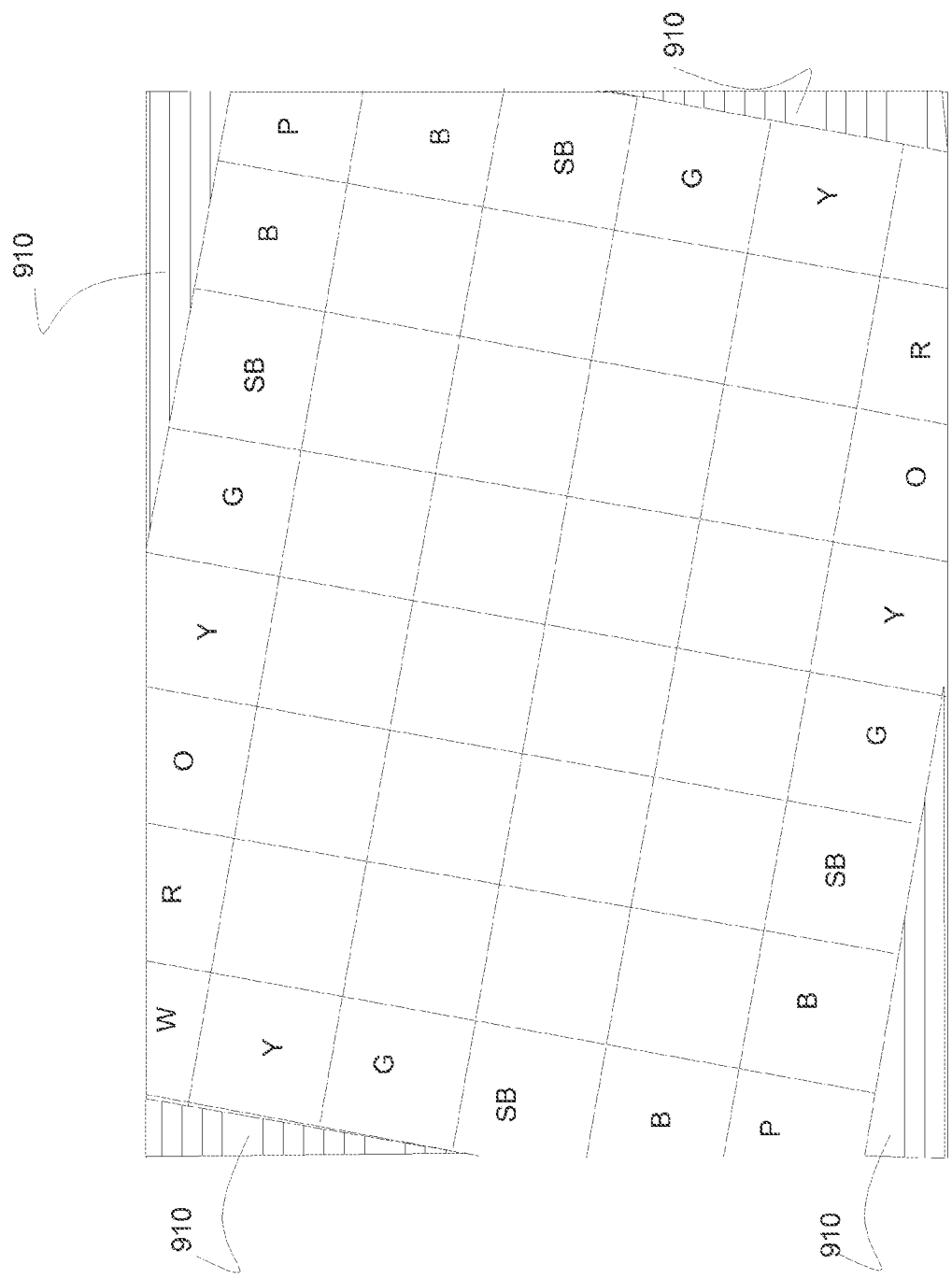
FIG. 9 shows an example of picture rotation according to an embodiment.
Figure 10:
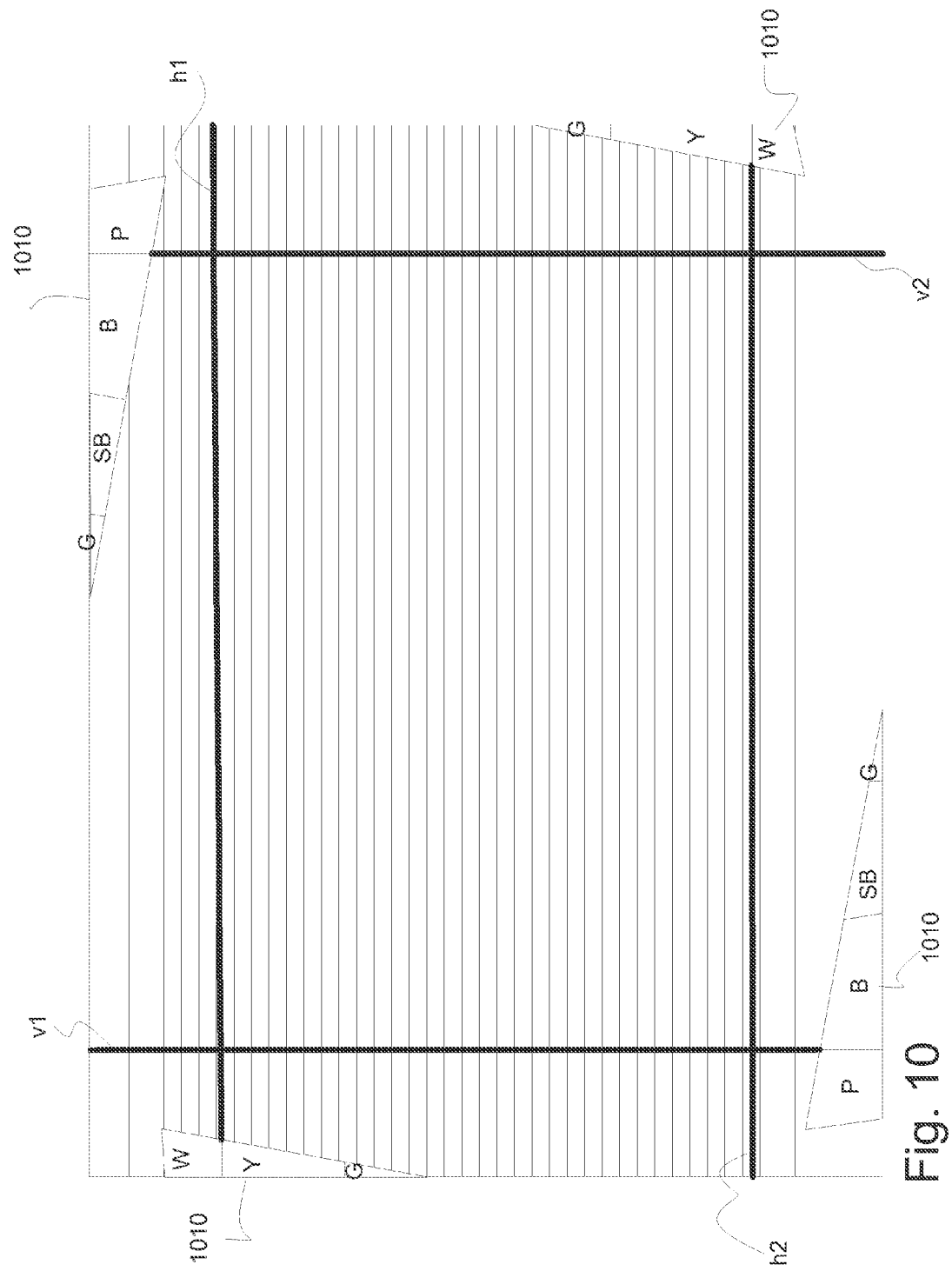
FIG. 10 shows an example of a master line detection according to an embodiment.

According to an embodiment, the method for producing an image shown in FIG. 8 comprises
 (1) rotating the image with angle θ (theta) as shown in FIG. 9. The angle may be within ±15 degrees. Remaining corners are illustrated with reference 910.
 (2) detecting (2) a master line v1, h1, v2, h2 from each remaining corner 1010 as shown in FIG. 10.
 (3) transforming (i.e. scaling (i.e. resizing), translating (i.e. shifting, panning, moving) and skewing) the remaining corners according to the feature master lines detected in previous step (2).
 (4) filling the after-rotating empty corners with transformed remaining corners that were obtained in the previous step (3).

The step of detecting (2) a master line from each remaining corner (FIG. 10) comprises 2.1) blacking out certain area to emphasize the remaining corners; 2.2) detecting all possible lines from each remaining corner; and 2.3) selecting master line from all possible lines.

Figure 11:
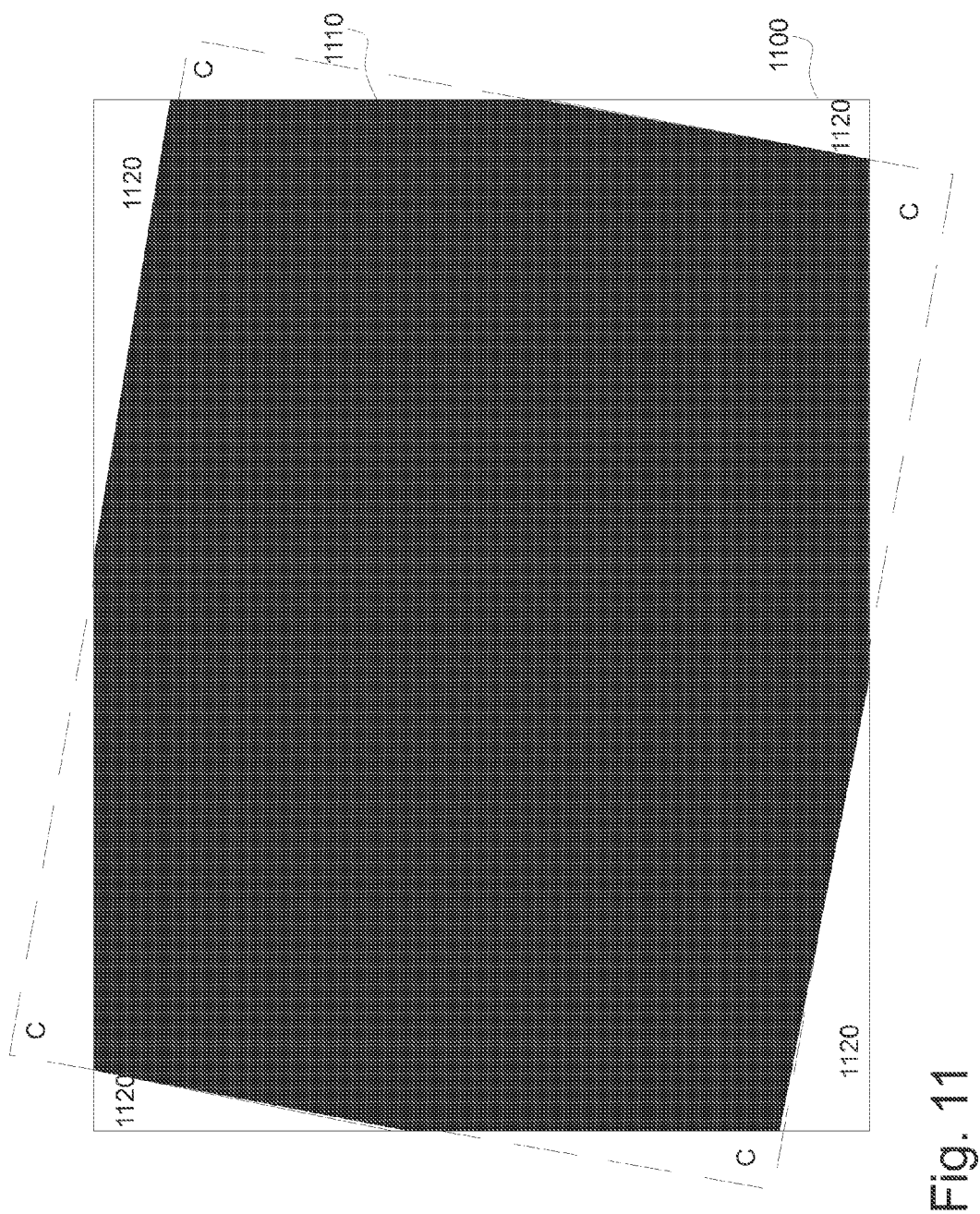
FIG. 11 shows an example of a blacking of a picture according to an embodiment.

FIG. 11 illustrates blacking out certain area to emphasize the remaining corners 1120 (2.1), wherein the central part of the original image (FIG. 5) is filled with a virtual image 1110. The fillable central part corresponds the area of the rectangular frame where the original image would be placed after rotation (see also FIG. 4). The virtual image 1110 has exactly the same dimension as the original image, and has been rotated with same angle θ (theta), but is just fully black and lacks corners C.

Figure 12:
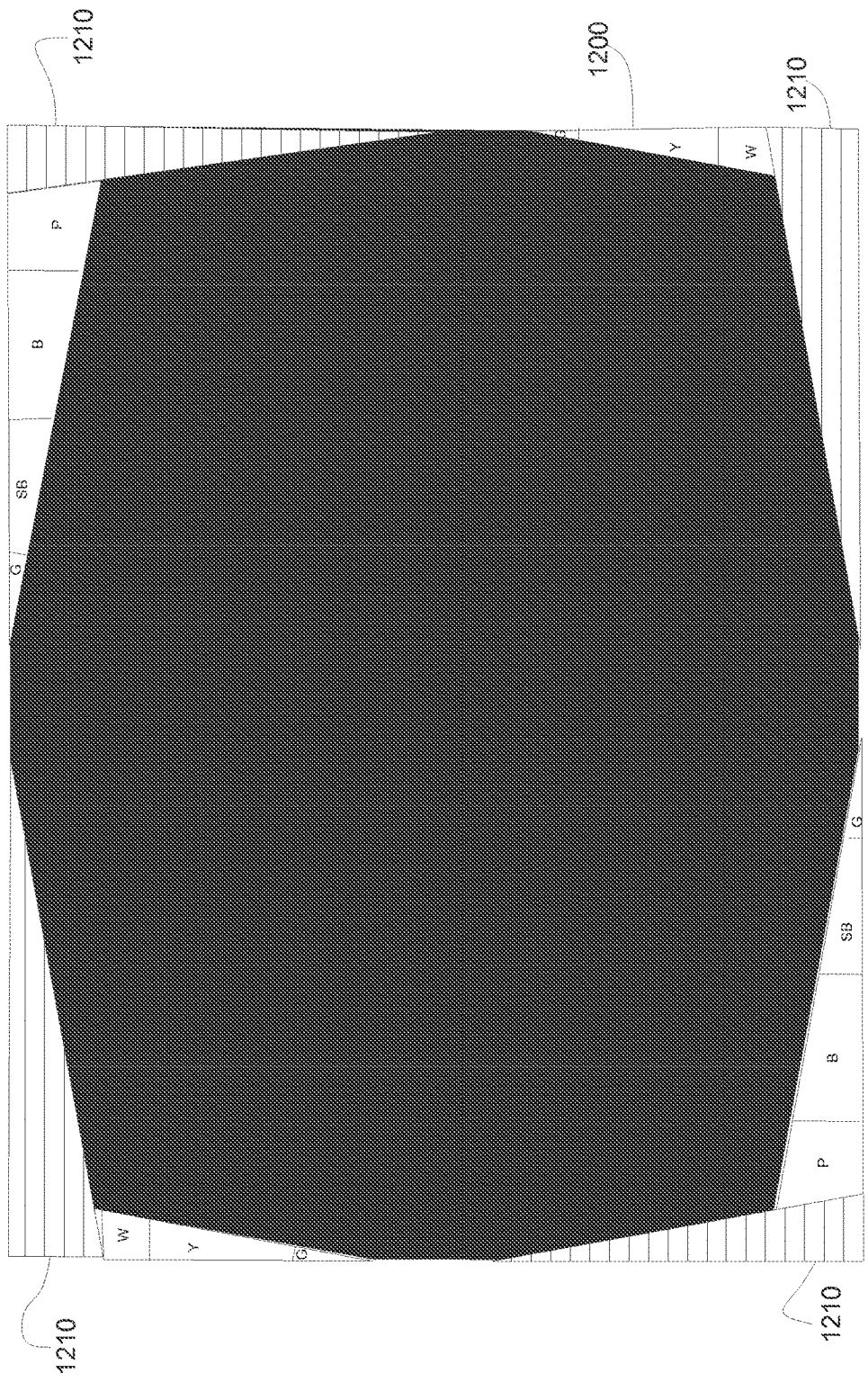
FIG. 12 shows an example of blacking out corners that a symmetric to parts being moved out.

With reference to FIG. 12, the corners 1210 in the original image 1200 comprises the content that is moved out when the image is rotated, (i.e. symmetrical to lacked corners C in FIG. 11). These are utilized for determining which part of the original image is to be blackout. The blackoutable corners are obtained as shown in FIG. 13.

Figure 13:
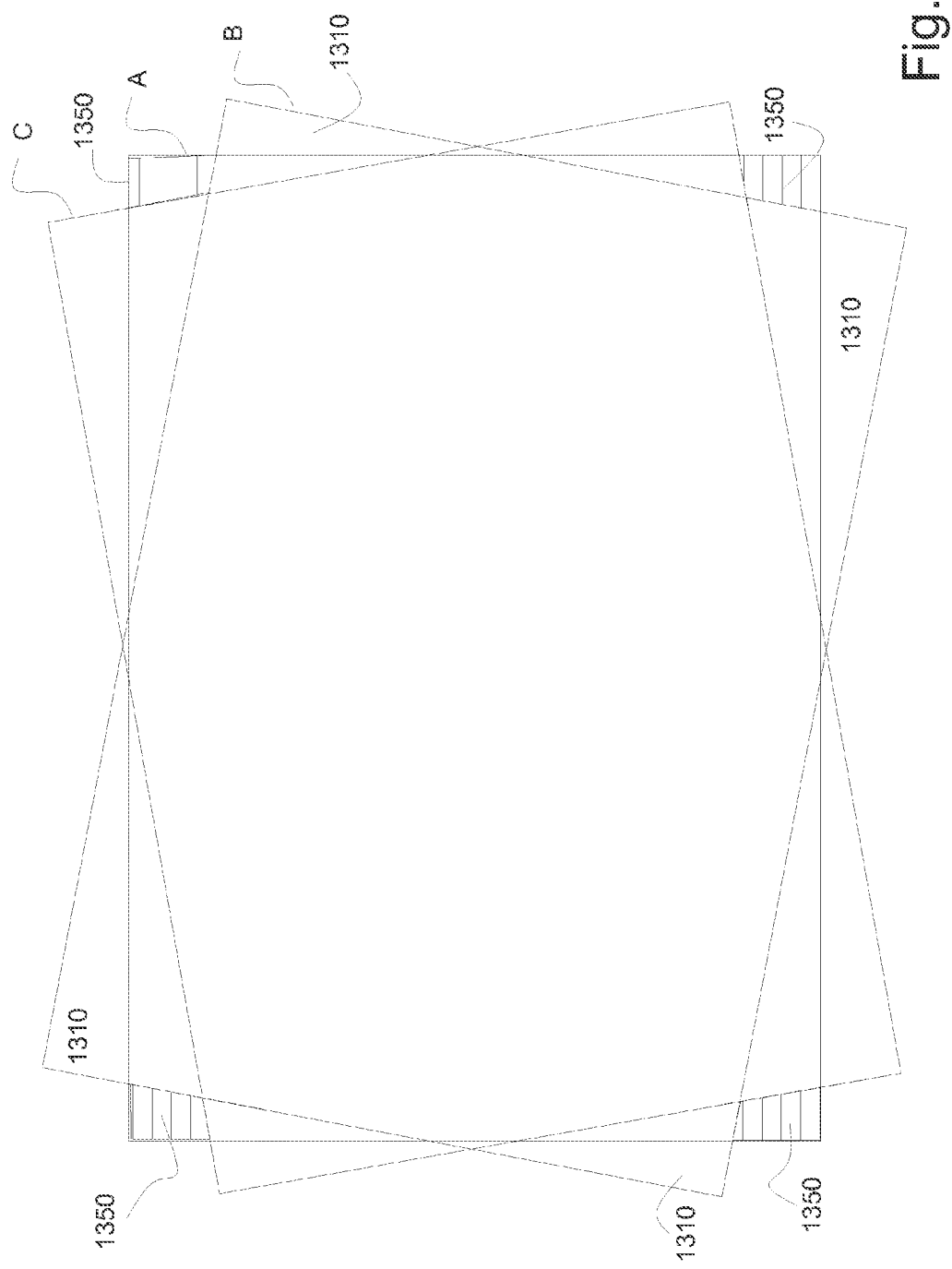
FIG. 13 shows an example of rolling out corners.

In FIG. 13, the rectangle A corresponds the original image. When the original picture frame (i.e. rectangle A) is rotated with angle θ (theta) to rectangle B, the corners 1310 move out from the original picture frame A. Now, the corners that are to be blackout are obtained by rotating the original image (rectangle) A to the opposite direction to get Rectangle C. The cutoff part between rectangles A, B and C are four blackout corner areas 1350.

For step 2.2. of detecting all possible lines from each remaining corner one can use any well-known line/edge detection algorithm, e.g. Canny Edge Detection. According to an embodiment, this phase comprises the following steps:
 if colour image, then convert the image to black and white;
 smooth the image if necessary;
 detect edges with Scharr kernel;
 perform non-maximum suppression;
 perform double thresholding;
 perform blob extraction;
 get all lines with votes to stand out the selected threshold.

Figure 14:
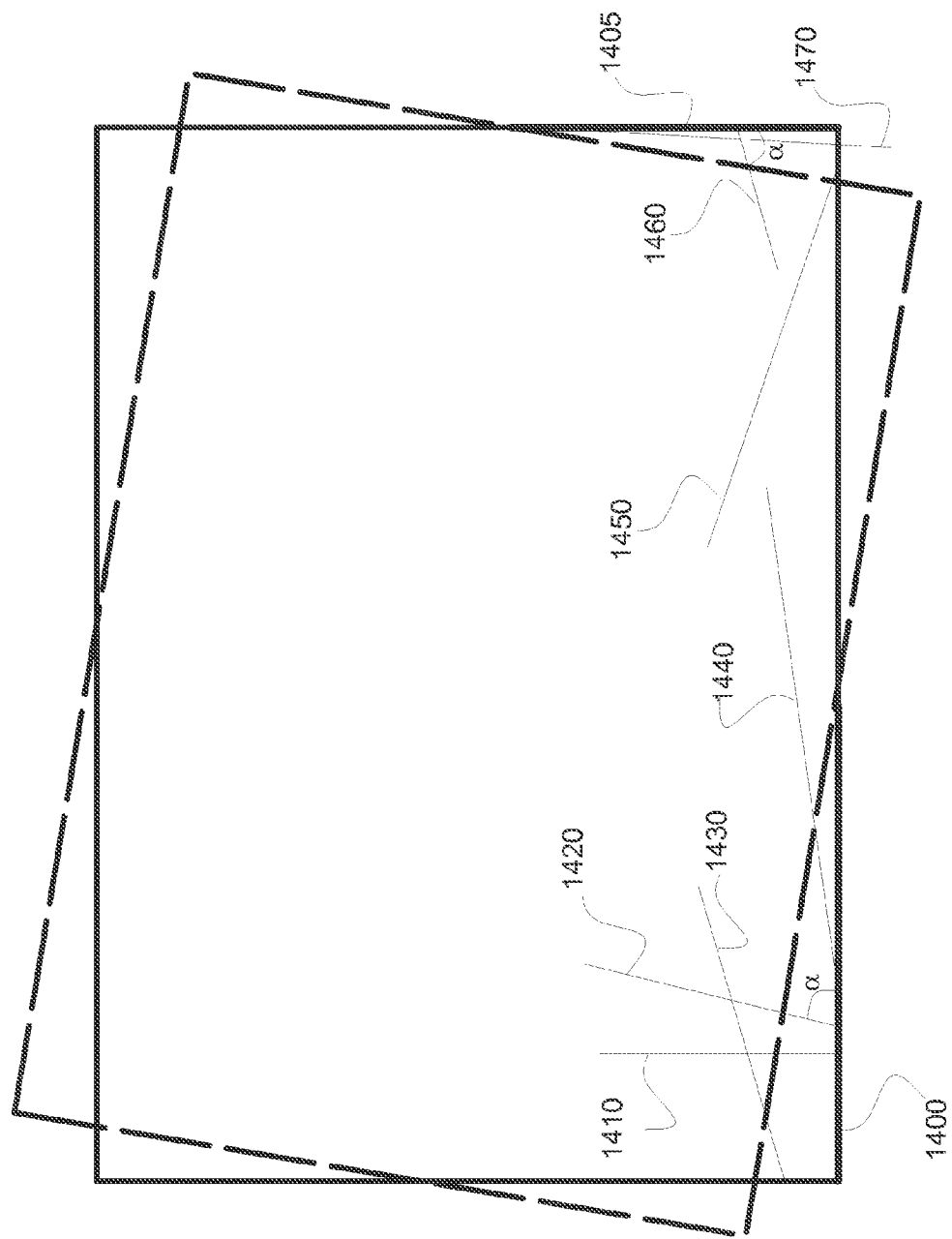
FIG. 14 shows an example of criteria for a master line.

The master line is selected (2.3) from all possible lines obtained in the previous step according to following criteria (FIG. 14):
 i) the voting number of the line should be the highest, but also
 ii) candidate lines 1420, 1460 (FIG. 14) should touch the reference line 1400, 1405 (FIG. 14);
 iii) the touch angle α (alpha) should exceed minimum degrees, e.g. 10 degrees. For example, lines 1440, 1470 in FIG. 14 fulfil the condition ii) but fail with lower than 10 degree touch angle against reference line 1400, 1405, so they cannot be chosen as master.
 iv) if there is no master line detected, it can be assumed that there is a line positioned at ⅛ width or height vertically to the reference edge, as the line 1410 in FIG. 14.

The criterion i) above refers to "voting number". This term relates to a technique for feature extraction technique where certain objects are found and grouped by a voting procedure. The higher voting number to a line means that the line looks (or is) more like a line than those with lower voting numbers.

The step of scaling, translating and skewing the remaining corners (3) comprises 3.1) calculating shifting distance according to master line's position and touch angle α (alpha) (see FIG. 14); 3.2) shifting content of the remaining corners by distance resulted from the previous step either X or Y direction; 3.3) scaling the remaining corners to compensate reduced length caused by rotation.

Figure 15:
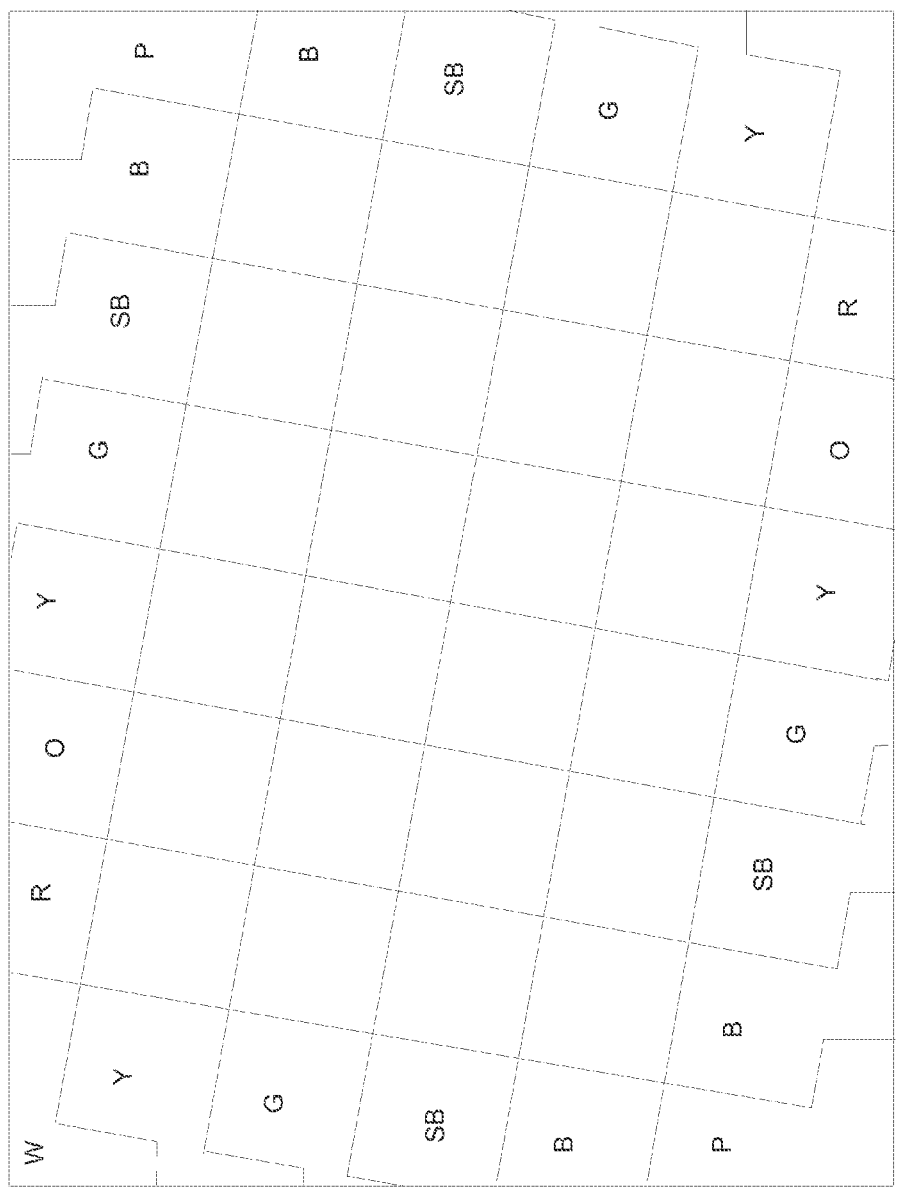
FIG. 15 shows an example of a picture with original corners without shifting.
Figure 16:
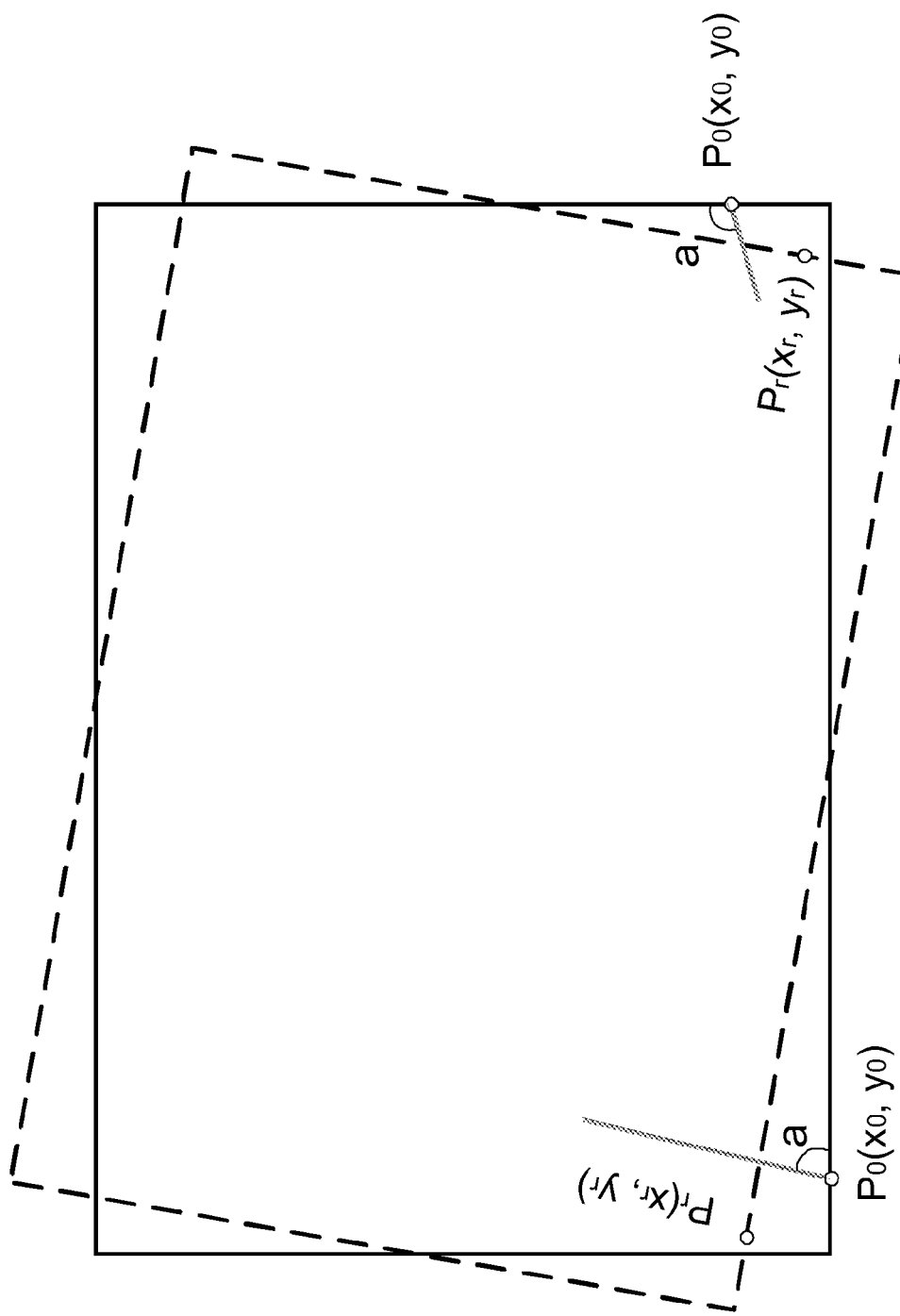
FIG. 16 shows an example of calculation of shifting distance.

For step 3.1), the reason for shifting content of remaining corners can be realized by comparing FIG. 8 and FIG. 15: without shifting, the texture of two parts will not align each other. If low-left corner of FIG. 15 is taken as an example, the corner P is staggered against its rotated-away part. The content of remaining corners need to be shifted outward from picture on negative X direction. The amount for shifting is decided by master line detected in step 2. The master line of low-left corner has been found as a vertical line v1 in FIG. 10, the shift distance can be calculated as follows (FIG. 16):

$$dx = |x_r - x_0| + |y_r - y_0| \tan \alpha, \ dy = 0; \text{ If shift } X \text{ward}$$

$$dy = |y_r - y_0| + |x_r - x_0| \tan \alpha, \ dx = 0; \text{ If shift } Y \text{ward}$$

where dx, dy are distance to shift; alpha (α) is the angle between master line and picture's reference edge; $P_0(x_0, y_0)$ is cross-point of master line and picture's reference edge; and $P_r(x_r, y_r)$ is rotated $P_0$.

Figure 17:
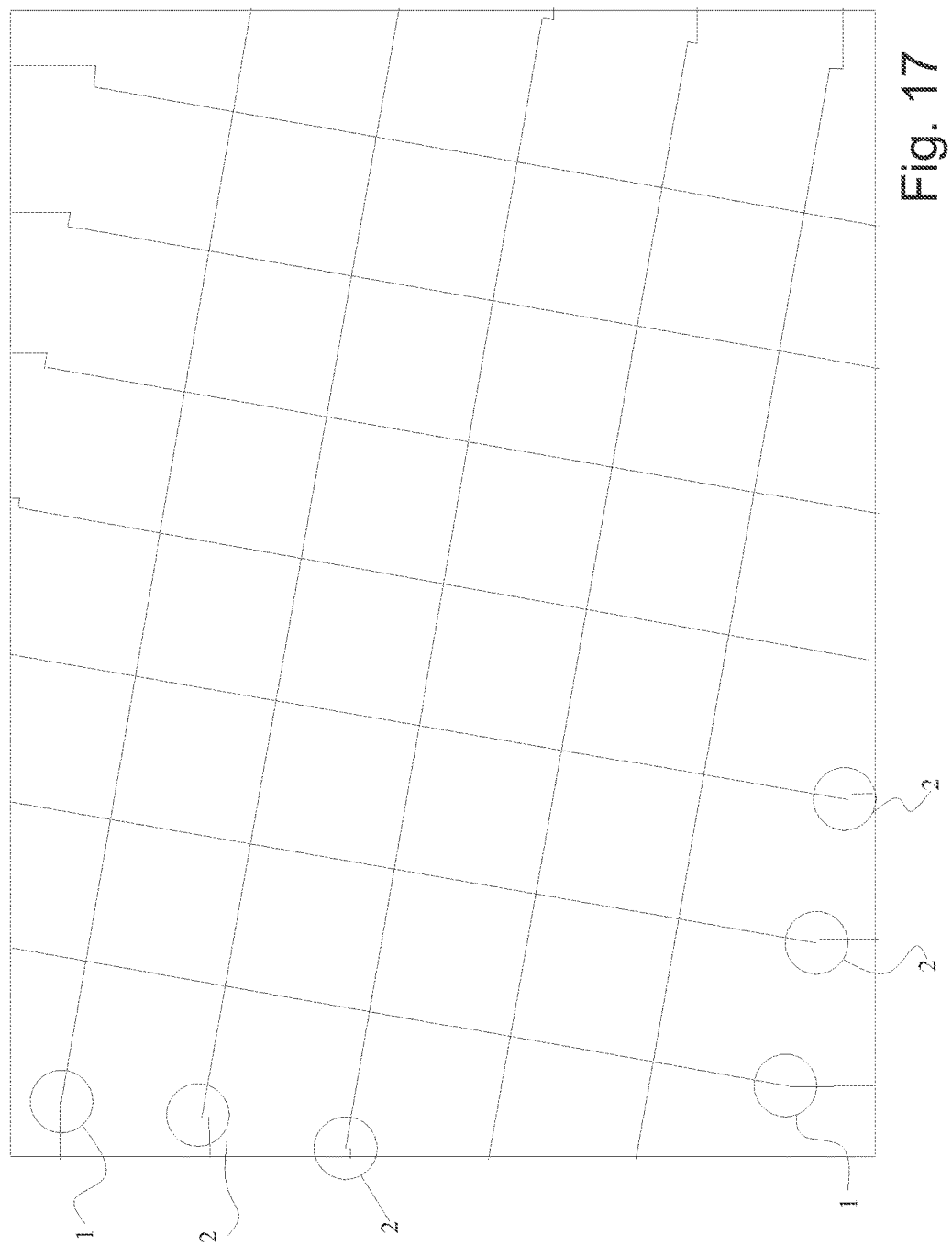
FIG. 17 shows an example of a rotated picture without scaling, with shifting.

Step 3.3) comprises scaling to harmonize other lines beside master. If the content of the remaining corners are shifted without scaling, it will result as FIG. 17: only the master lines are aligned (in circles 1), all other lines (in circles 2) mismatch and can't join to rotated textures. Therefore lost length caused by rotation is compensated as follows:

$$\text{scale} = \cos \theta$$

The content of the remaining corners are shrunk as cos θ is less or equal to 1 (cos θ≤1). The scaling only applies to the same direction of shifting for each corner, either X or Y, not necessarily at the same time.

Figure 18:
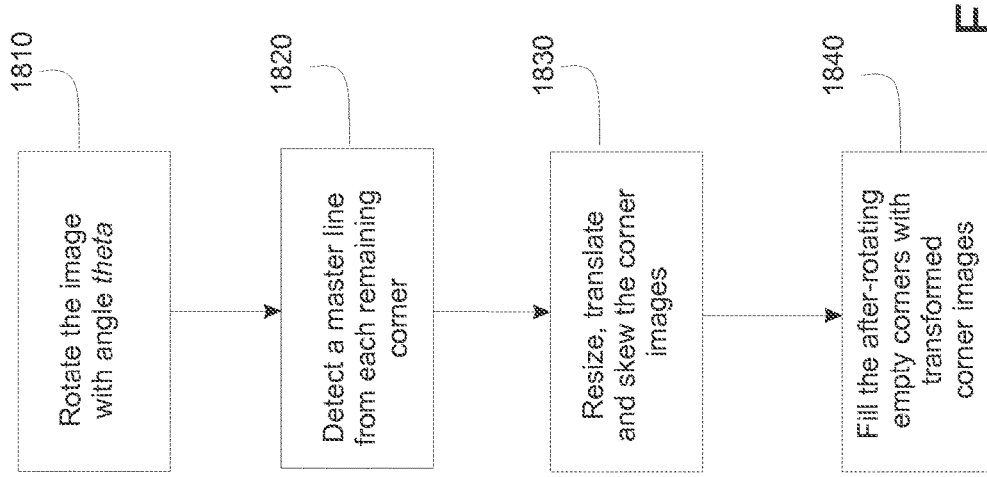
FIG. 18 shows an example of a method as a flowchart.

FIG. 18 illustrates a method according to an embodiment as a simplified flowchart. The method comprises rotate the image with angle theta 1810, which may be within ±15 degrees; detect a master line from remaining corners 1820 (FIG. 19 describes step 1820 in more detailed manner); transform (e.g. resize, translate and skew) the remaining corners 1830 (FIG. 20 describes step 1830 in more detailed manner); and fill the after-rotating empty corners with transformed remaining corners 1840.

Figure 19:
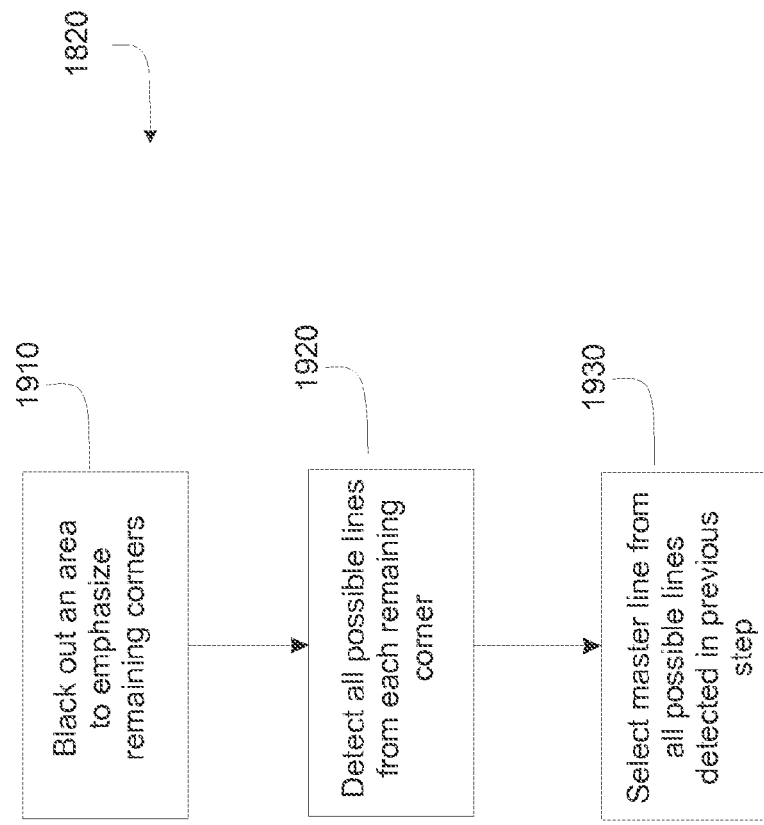
FIG. 19 shows an example of a method step as a flowchart.

FIG. 19 illustrates method step 1820 (FIG. 18) in more detail. The method step 1820 comprises blacking out an area to emphasize remaining corners 1910; detecting all possible lines from each remaining corner 1920; and selecting master line from all possible lines detected in previous step 1930. In step 1910, the central part of the original image is filled with virtual image. The fillable central part corresponds the area of the rectangular frame where the original image would be placed after the rotation. The virtual image has the same dimension as the original image, and has been rotated with same angle, e.g. ≤±15 degrees. The corners that are symmetrical to lacked corners are then blackout. The corners that are to be blackout are obtained by rotating the original image (rectangle) from a first direction (original direction) to a second direction and then to a third direction which is an opposite direction of the second direction. The cutoff part between the positions of the original image in the first, second and third directions are four blackout corner areas.

Figure 20:
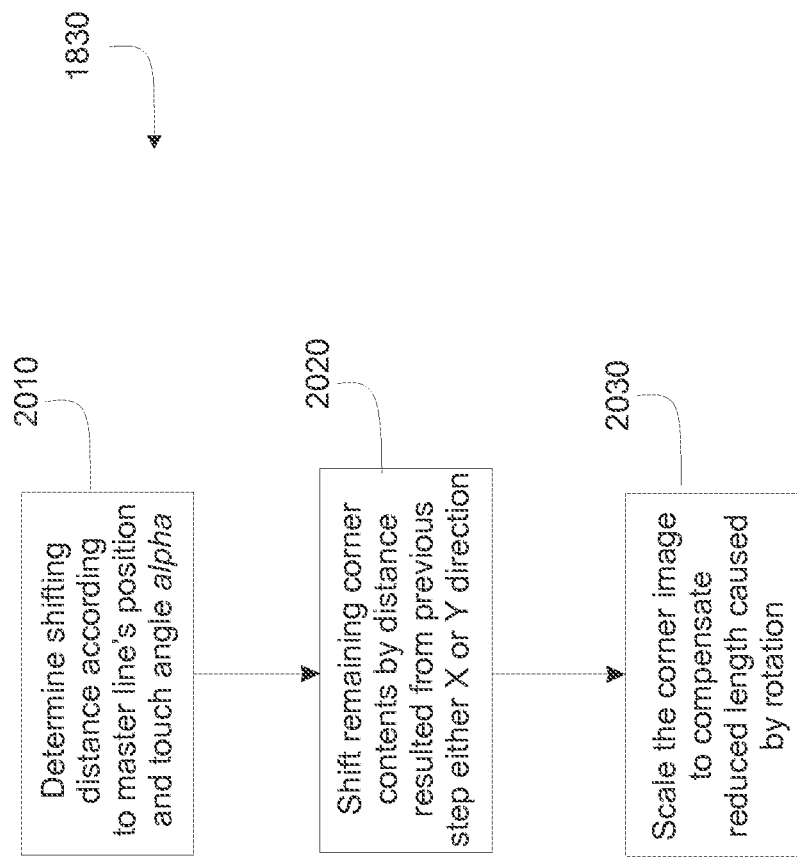
FIG. 20 shows an example of a method step as a flowchart.

FIG. 20 illustrates method step 1830 (FIG. 18) for transforming the remaining corners in more detail. The method step 1830 comprises determining shifting distance by a master line 2010, which has been selected from all possible lines which have been detected from each remaining corner.

In particular, the shifting distance is determined by how the master line is positioned and angled to a reference line. The shift distance is determined as follows $$dx=|x_r-x_0|+|y_r-y_0|\tan \alpha, dy=0; \text{If shift } X\text{ward}$$

$$dy=|y_r-y_0|+|x_r-x_0|\tan \alpha, dx=0; \text{If shift } Y\text{ward}$$

where dx, dy are distance to shift; alpha ($\alpha$) is the angle between master line and picture's reference edge; $P_0(x_0, y_0)$ is cross-point of master line and picture's reference edge; and $P_r(x_r, y_r)$ is rotated $P_0$.

The remaining corner contents are shifted by distance resulted from previous step either in X or Y direction 2020. The remaining corners are scaled to compensate reduced length caused by rotation 2030. The compensation is achieved with:

$$\text{scale}=\cos \theta$$

The remaining corners are shrunk as $\cos \theta$ is less or equal to 1 ($\cos \theta \leq 1$). The scaling only applies to the same direction of shifting for each corner, either X or Y, not necessarily at the same time.

The various embodiments have technical effects. For example, image content is conserved naturally in the rotated image, and the image size is kept the same as the original. After rotation according to present embodiments, the rotated image is more analogous with the original image than what is resulted with solutions disclosed with reference to FIGS. 6 and 7. In addition, there is no reduced image size.

Previous embodiments can be combined to provide further embodiments.

It is appreciated that the methods illustrated in FIGS. 18, 19 and 20 can be implemented in an apparatus. The apparatus comprises at least one processor, memory including computer program code, the memory and the computer program code configured to, with the at least one processor, cause the apparatus to perform one or more of the method steps shown in FIG. 18, FIG. 19 and FIG. 20. An apparatus according to an embodiment comprises processing means and memory means and means for performing one or more of the method steps shown in FIG. 18, FIG. 19 and FIG. 20.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

According to an embodiment computer program product embodied on a non-transitory computer readable medium, comprise computer program code configured to, when executed on at least one processor, cause an apparatus or a system to rotate an original image in an image frame by an angle to have a rotated image in said image frame, wherein said image frame comprising said rotated image has empty corners lacking image data; compare the rotated image to the original image to identify corner content; and add the corner content to the empty corners of the image frame comprising said rotated image. The computer program comprises instructions for rotating an original image in an image frame by an angle to have a rotated image in said image frame, wherein said image frame comprising said rotated image has empty corners lacking image data; for comparing the rotated image to the original image to identify corner content; and for adding the corner content to the empty corners of the image frame comprising said rotated image.

The present invention is not limited solely to the above-presented embodiments, but it can be modified within the scope of the appended claims.

The invention claimed is:

1. A method, comprising:
rotating an original image in an image frame by an angle to have a rotated image in said image frame, wherein said image frame comprising said rotated image has empty corners lacking image data;
comparing the rotated image to the original image to identify remaining corners;
adding content of the remaining corners to the empty corners of the image frame comprising said rotated image, wherein the content comprises line-detected and adjusted information associated with the original image; and
adjusting the content of the remaining corners by shrinking content of the remaining corners with a predetermined scaling factor to compensate for reduced length caused by rotation, wherein the predetermined scaling factor applies to the remaining corners of the rotated image while maintaining unaltered original dimensions of other portions of the rotated image.

2. The method according to claim 1, wherein the remaining corners the rotated image is compared to the original image in the direction of rotation and in the opposite direction of rotation.

3. The method according to claim 1, further comprising detecting a master line from remaining corners.

4. The method according to claim 3, further comprising determining shifting distance according to position of the master line.

5. The method according to claim 4, wherein the shifting distance determined by the master line.

6. The method according to claim 5, wherein the shifting distance is determined by how the master line is positioned and angled.

7. The method according to claim 4, further comprising shifting remaining corners by the determined shifting distance.

8. An apparatus comprising at least one processor, and memory including computer program code, the memory and the computer program code configured to, with the at least one processor, cause the apparatus to perform at least the following:
  rotate an original image in an image frame by an angle to have a rotated image in said image frame, wherein said image frame comprising said rotated image has empty corners lacking image data;
  compare the rotated image to the original image to identify remaining corners;
  add content of the remaining corners to the empty corners of the image frame comprising said rotated image, wherein the content comprises line-detected and adjusted information associated with the original image; and
  adjust the content of the remaining corners by shrinking content of the remaining corners with a predetermined scaling factor to compensate for reduced length caused by rotation, wherein the predetermined scaling factor applies to the remaining corners of the rotated image while maintaining unaltered original dimensions of other portions of the rotated image.

9. The apparatus according to claim 8, further comprising computer program code to cause the apparatus to compare the rotated image to the original image in the direction of rotation and in the opposite direction of rotation.

10. The apparatus according to claim 8, further comprising computer program code to cause the apparatus to detect a master line from remaining corners.

11. The apparatus according to claim 10, further comprising computer program code to cause the apparatus to determine shifting distance according to position of the master line.

12. The apparatus according to claim 11, further comprising computer program code to cause the apparatus to determine the shifting distance by the master line.

13. The apparatus according to claim 12, further comprising computer program code to cause the apparatus to determine the shifting distance by how the master line is positioned and angled.

14. The apparatus according to claim 11, further comprising computer program code to cause the apparatus to shift the remaining corners by the determined shifting distance.

15. A computer program product embodied on a non-transitory computer readable medium, comprising computer program code configured to, when executed on at least one processor, cause at least one of an apparatus or a system to:
  rotate an original image in an image frame by an angle to have a rotated image in said image frame, wherein said image frame comprising said rotated image has empty corners lacking image data;
  compare the rotated image to the original image to identify remaining corners;
  add content of the remaining corners to the empty corners of the image frame comprising said rotated image, wherein the content comprises line-detected and adjusted information associated with the original image; and
  adjust the content of the remaining corners by shrinking content of the remaining corners with a predetermined scaling factor to compensate for reduced length caused by rotation, wherein the predetermined scaling factor applies to the remaining corners of the rotated image while maintaining unaltered original dimensions of other portions of the rotated image.

16. The computer program product according to claim 15, comprising computer program code configured to cause at least one of an apparatus and a system to compare the rotated image to the original image in the direction of rotation and in the opposite direction of rotation.

17. The computer program product according to claim 15, comprising computer program code configured to cause at least one of an apparatus and a system to detect a master line from remaining corners.

18. The computer program product according to claim 17, comprising computer program code configured to cause at least one of an apparatus and a system to determine shifting distance according to position of the master line.

19. The computer program product according to claim 18, comprising computer program code configured to cause at least one of an apparatus and a system to determine the shifting distance by the master line.

20. The computer program product according to claim 19, comprising computer program code configured to cause at least one of an apparatus and a system to determine the shifting distance by how the master line is positioned and angled.

21. The computer program product according to claim 18, comprising computer program code configured to cause at least one of an apparatus and a system to shift the remaining corners by the determined shifting distance.

* * * * *